United States Patent [19]

Dickerson

[11] Patent Number: 4,523,774
[45] Date of Patent: Jun. 18, 1985

[54] COLLAPSIBLE TOW CART

[75] Inventor: James Dickerson, Pomona, N.Y.

[73] Assignee: Kevin E. Brown, Tallman, N.Y.

[21] Appl. No.: 541,435

[22] Filed: Oct. 13, 1983

[51] Int. Cl.³ .............................................. B62B 1/20
[52] U.S. Cl. .................................. 280/655; 280/659;
280/47.24
[58] Field of Search ............... 280/652, 655, 659, 638,
280/47.26, 47.24, 47.13, 47.13 B, 47.33, 47.37
R, 653; 62/457

[56] References Cited
U.S. PATENT DOCUMENTS

| 2,938,734 | 5/1960 | Guimond | 280/47.37 R |
| 3,125,351 | 3/1964 | McDonough | 280/47.13 B |
| 3,222,100 | 12/1965 | Lindzy | 280/47.24 |
| 3,679,227 | 7/1972 | Rock | 280/47.24 |
| 3,826,511 | 7/1974 | Frank | 280/653 |

FOREIGN PATENT DOCUMENTS 209888  1/1924  United Kingdom ................. 280/47

Primary Examiner—David M. Mitchell
Assistant Examiner—Richard Camby
Attorney, Agent, or Firm—Michael Ebert

[57] ABSTRACT

A collapsible tow cart for transporting a load of beach items over sandy terrain to a beach site. The cart whose structure, save for the wheels, is fabricated of light weight metal tubing, has three basic components: the first of which is a rectangular main frame having parallel sides and upturned ends to define a carrying bed for the beach items. Perpendicular to the main frame and attached to the front thereof in a T-formation are the parallel sides of a rectangular cross frame whose downturned ends are V-shaped. The apexes of these ends lie below the main frame and are joined by a transverse axle. Mounted on this axle in the open region between the ends of the cross frame and the sides of the main frame are two identical balls which function as cart wheels. The third component is a rectangular loop whose parallel sides are pivotally connected at a point adjacent the lower end thereof to the corresponding sides of the main frame at the rear thereof, whereby in the erect state of the loop, the lower end functions as a ground rest and the upper end as a handle to pull the cart, the loop being foldable over the main frame to collapse the cart.

7 Claims, 4 Drawing Figures

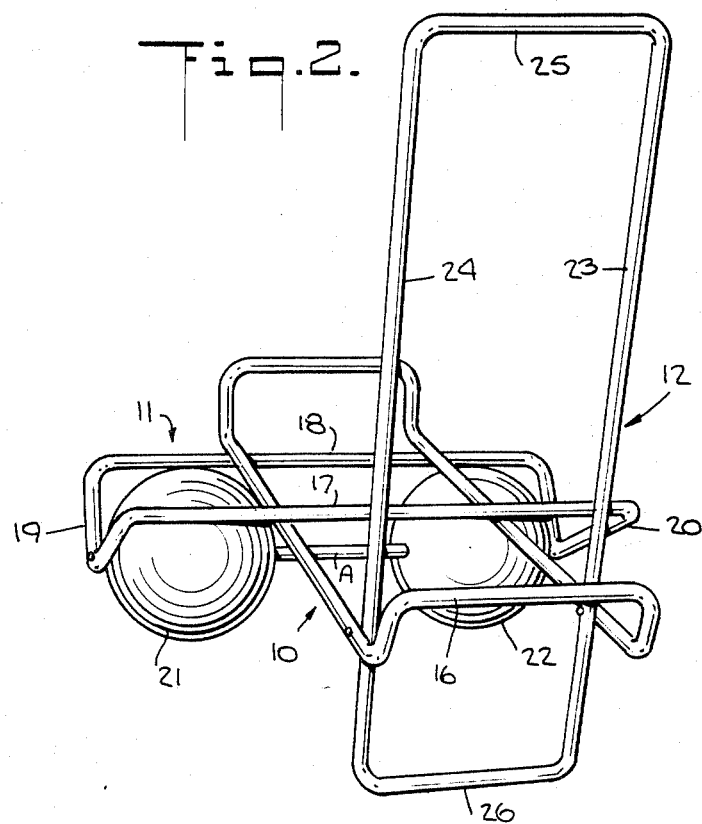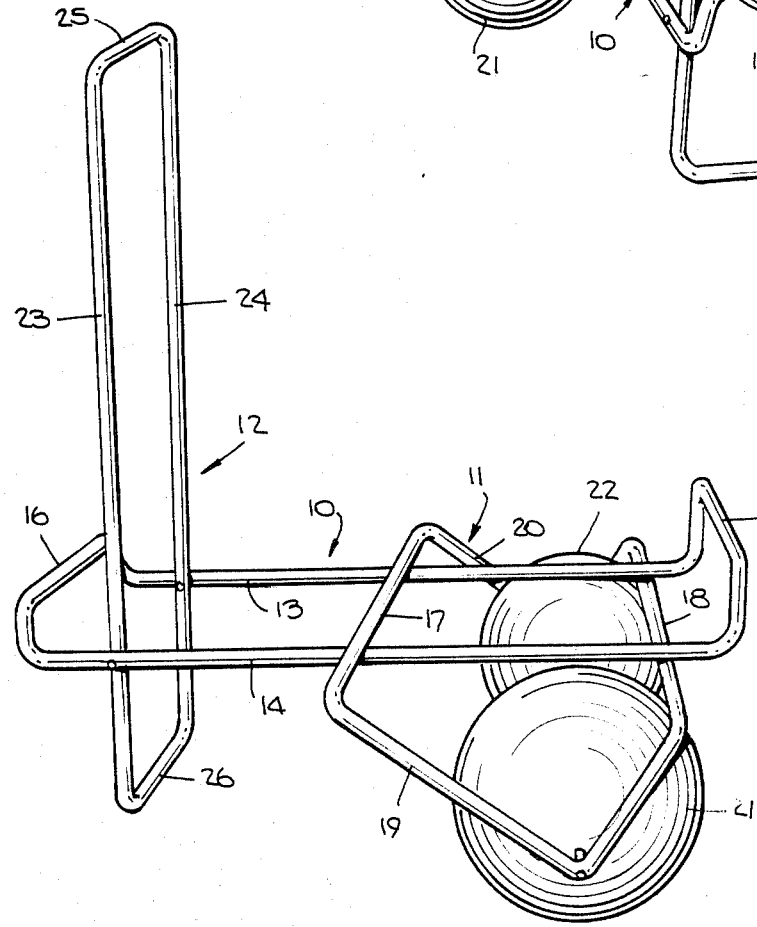

COLLAPSIBLE TOW CART

BACKGROUND OF THE INVENTION

Field of the Invention

This invention relates generally to manually-drawn carts for transporting small loads, and more particularly to a light-weight, high-strength tow cart adapted to carry beach items such as picnic cold chests and beach chairs over sandy terrain.

By definition, a cart is a two-wheeled vehicle often used in farming or for transporting freight, the vehicle being drawn by a horse, a pony or even a dog.

In modern beach recreational facilities, the need often arises to transport beach chairs, a picnic cold chest a beach umbrella, apparel and other beach items from an automobile stationed in a parking lot adjacent the beach to a selected site. In some cases, this beach site may be as far as a half mile away from the parking lot.

A problem commonly experienced in a situation of this type is that while the typical small cart or wagon is normally capable of transporting a load over hard or paved surfaces, it is ill suited for travel over sand. Conventional cart wheels tend ro furrow the sand, particularly if the load is fairly heavy. Should the sand be quite soft, it then becomes very difficult, if not impossible, to pull the loaded cart.

And even if the cart is designed for beach use and is provided with balloon tires that present a relatively broad tread and have a lesser tendency to sink into soft sand, there is the problem of fitting a cart of this type into the trunk of an automobile or into whatever other storage space is available.

In the typical beach scenario which calls for the use of a tow cart, say, on a family picnic in which three or more members of a family use the family car to travel to the beach, space in the car is usually at a premium. Not only are the passenger seats occupied, but whatever other space remains is fairly well filled with picnic items. Since even a conventional small cart or wagon occupies a relatively large volume, it is often difficult to find space therefor in an already loaded family car.

A particular problem with conventional beach carts or wagons is the picnic cold chest, which takes the form of a large, thermally insulated box usually made of foam plastic material adapted to store food and liquid containers in a reduced temperature environment. The size of this chest is such that with a conventional cart, it pre-empts most of the available space, allowing little room for other necessary items. Also, with a conventional cart, it is difficult to harness the cold chest to the cart to prevent it from falling off when the cart travels over more or less rough terrain.

SUMMARY OF INVENTION

In view of the foregoing, the main object of this invention is to provide a collapsible tow cart suitable for transporting a substantial load of recreational or other items over sandy terrain, the cart in the collapsed state being highly compact so that it may be stored in a limited area.

More particularly, an object of this invention is to provide a collapsible cart of the above type which is of high structural strength, yet is exceptionally light in weight so that it may be handled without difficulty even by children.

Also an object of this invention is to provide a cart of the above type adapted to accommodate a picnic cold chest which may be securely harnessed to the cart, the cart still having ample room to accommodate many other beach items. Thus while the cart is relatively small, it has an unusually large load capacity.

Still another object of the invention is to provide a cart whose wheels are in the form of balls which rotate on their polar axis and are capable of presenting a very broad tread to soft sand and making it possible to travel easily over sandy as well as hard terrain, even with heavy loads.

A further object of the invention is to provide an inexpensive cart of the above type which may be mass-produced at low cost.

Briefly stated, these objects are accomplished by a collapsible tow cart for transporting a load of beach items over sandy terrain to a beach site. The cart whose structure, save for the wheels, is fabricated of light weight metal tubing, has three basic components: the first of which is a rectangular main frame having parallel sides and upturned ends to define a carrying bed for the beach items. Perpendicular to the main frame and attached to the front thereof in a T-formation are the parallel sides of a rectangular cross frame whose down-turned ends are V-shaped. The apexes of these ends lie below the main frame and are joined by a transverse axle. Mounted on this axle in the open region between the ends of the cross frame and the sides of the main frame are two identical balls which function as cart wheels. The third component is a rectangular loop whose parallel sides are pivotally connected at a point adjacent the lower end thereof to the corresponding sides of the main frame at the rear end functions as a ground rest and the upper end as a handle to pull the cart, the loop being foldable over the main frame to collapse the cart.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a tow cart in accordance with the invention as seen from the side;

FIG. 2 is a perspective view of the tow cart as seen from the rear;

DESCRIPTION OF INVENTION

Figure 3:
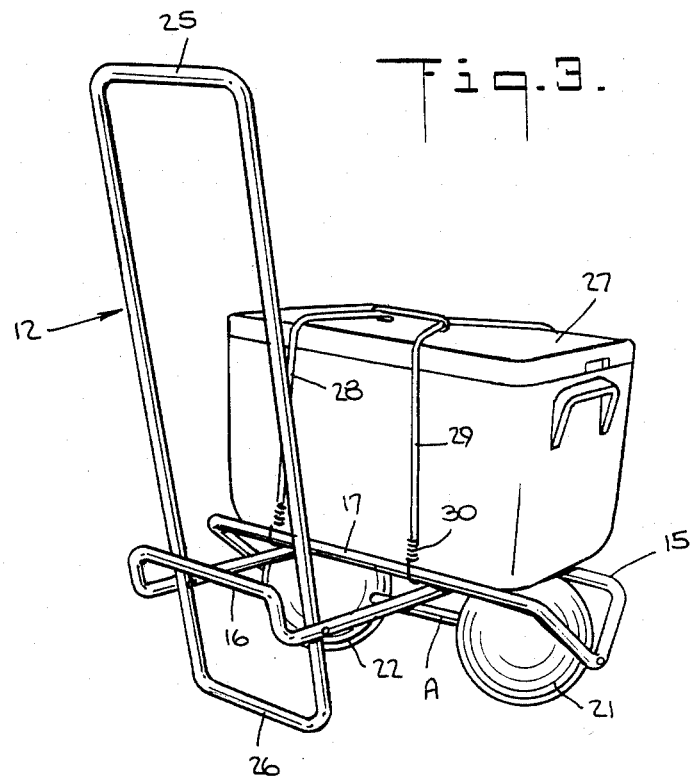
FIG. 3 shows a picnic cold chest strapped onto the tow cart.

Referring now to the figures showing a tow cart in accordance with the invention, it will be seen that the cart is constituted by three basic components: a main frame, generally designated by numeral 10; a cross frame 11; and a loop 12. All of these components are preferably fabricated of high-strength metal tubing such light-weight extruded aluminum or heavier stainless steel. The tubing may have a circular, square or other crosssectional form to create structural beams.

Main frame 10, which is of generally rectangular form, is defined by a pair of parallel sides 13 and 14 and upturned front and rear ends 15 and 16. The main frame acts as the loading bed of the cart.

Cross frame 11 connected to main frame 10 is also generally rectangular in form and is composed of parallel sides 17 and 18 and down-turned V-shaped ends 19 and 20 whose apexes lie below the main frame. The cross frame is attached in a T-formation to the front of main frame 10, the sides 17 and 18 of the cross frame being perpendicular to the sides 13 and 14 of the main frame.

Rear side 17 of cross frame 11 is attached to the upper face of sides 13 and 14 of the main frame to form a raised ledge on the loading bed, whereas front side 18 of the cross frame is attached to the underface of sides 13 and 14. Because sides 17 and 18 are then at different heights with reference to ground level, the V-shaped down-turned ends 19 and 20 are made asymmetrical to take account of this difference.

Extending between the apexes of the V-shaped ends 19 and 20 of the cross frame is a transverse axle A. Mounted on this axle in the open regions between the V-shaped ends 19 and 20 and the main frame sides 19 and 20 are two identical balls 21 and 22 which turn on their polar axis and function as the wheels of the cart.

These spherical bodies may be formed of resilient foam synthetic plastic material such as polyurethane, or rubber. When riding over a hard surface with a light load, the balls make close to point contact therewith with minimal resistance. However over soft sand and with a fairly heavy load, the balls tend to flatten somewhat and do not, therefore, furrow the sand but run over the surface thereof with a relatively broad tread. Since the balls do not sink into the sand, it becomes possible to draw the cart without difficulty.

Loop 12, which is rectangular in form is constituted by parallel sides 23 and 24 and upper and lower ends 25 and 26 all lying in the same place. Sides 23 and 24, which lie within the corresponding sides 13 and 14 of the main frame, are pivotally connected thereto at a position adjacent the lower end 25 of the loop. Thus when the loop is erected, as shown in FIGS. 1 and 2, the lower end 25 thereof functions as a ground rest, and the upper end 26 as a handle.

In loading the cart, as shown in FIG. 3, with a picnic cold chest 27, the dimensions of the cart as such that the typical cold chest will fit across the bed in the confined space between the upturned front end 15 of the main frame and the ledge formed by rear side 17 of the cross frame, so that the chest is then nested on the bed. To harness the chest to the bed, use may be made of stretchable straps 28 and 29 having terminal hooks 30 thereon which engage front end 15 and side 17 to prevent the chest from being dislodged during transport.

Hence the cart design is such that the main load rests on the front thereof over the wheels. The space between the cold chest and loop 12, at the rear of the bed may be used for accomodating folding beach chairs and other beach items. When the handle end 26 is grasped and pulled, the loop swings against the rear upturned end 16 of the main frame. At this fixed angle, it is easy to pull the cart, for the load on the front end causes the load to pivot on the ball wheels when the handle is then raised to lift the lower end of the loop above the ground. When the beach site is reached, the loop is positioned vertically to form the ground rest.

Figure 4:
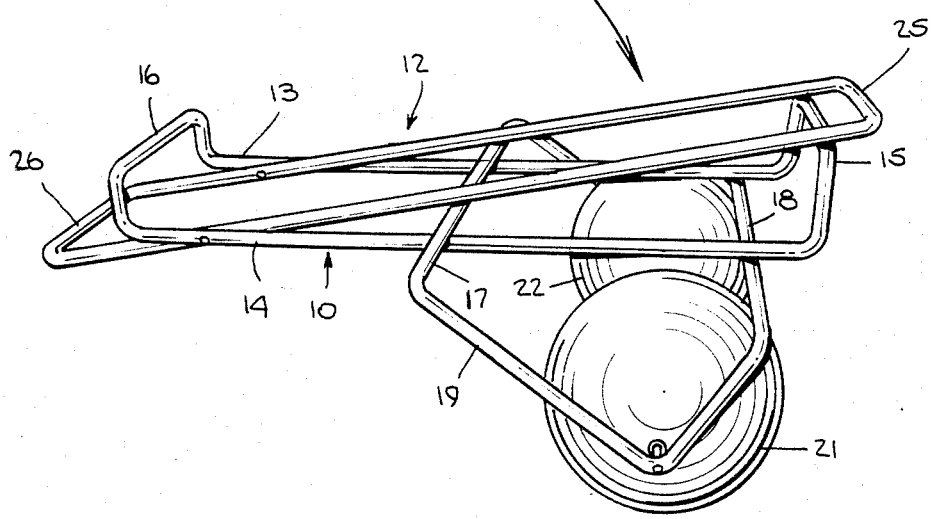
FIG. 4 shows the cart in the collapsed state.

When the cart is to be collapsed, one simply swings loop 12 forward so that it falls down over the main frame, as shown in FIG. 4. The collapsed cart is then quite compact so that it can be conveniently stored in a small space. To further reduce the space occupied by the cart, the cross frame may be removed from its cross position and superposed over the main frame to reduce the width of the cart assembly.

It is to be understood that the use of the cart is not limited to sandy beaches and that it also has many useful domestic and garden applications, particularly if one attaches a sizable open box to the bed of the cart so that it functions as a barrow.

While there has been shown and described a preferred embodiment of COLLAPSIBLE TOW CART, it will be appreciated that many changes and modifications may be made therein without, however, departing from the essential spirit thereof. Thus instead of ball wheels, use may be made of balloon tires or other wheels capable of travelling over sand. And instead of metal tubing for the components, use may be made of high-strength, rigid plastic tubing such as polycarbonates. In practice, handle 25 may be provided with a gripping sleeve, and the ground rest 26 may be provided with a protective sheath. Alternately, the tubular sides 13 and 14 of the main frame may be formed of telescoping bars so that the load bed may be expanded, if desired.

Instead of using a resilient foam plastic material for the ball-shaped wheels, use may be made of lightweight, hollow, plastic, rigid spheres capable of supporting moderate loads (under 100 lbs.) without suffering permanent set during normal beach usage. These balls may be fabricated by roto casting a moderately rigid plastisol or plasticized PVC formulation.

I claim:

1. A collapsible tow cart for beach use and similar applications comprising:
    A a generally rectangular main frame having parallel beams and upturned front and rear ends to provide a loading bed;
    B a generally rectangular cross frame attached across the front of the main frame in a T-formation, said cross frame having parallel beams which are connected to the beams of the main frame at their points of intersection and having down-turned V-shaped ends whose apexes lie below the main frame and are joined by a transverse axle, the rear beam of the cross frame being attached to the upper face of the main frame beams to form a ledge, the front beam being attached to the under face of the main frame beams, the space between the ledge and the upturned front end of the main frame being sufficient to accommodate a cold chest;
    C two identical wheels mounted on said axle in the open region between the ends of the cross frame and the beams of the main frame; and
    D a rectangular loop having parallel beams pivotally connected to the beams of the main frame within the rear thereof at a position spaced from the upturned rear end at a point adjacent the lower end of the loop whereby when the loop is erected, the lower end functions as a ground rest and the upper end as a cart handle, such that when the cart is drawn, the loop abuts the upturned rear end of the main frame and is at an angle to the main frame, the loop being foldable over the main frame to collapse the cart, the space between the ledge and the erected loop being sufficient to accommodate folded beach chairs.

2. A tow cart as set forth in claim 1, wherein said main frame, said cross frame and said loop are fabricated of metal tubing.

3. A tow cart as set forth in claim 2, wherein said tubing is of extruded aluminum.

4. A tow cart as set forth in claim 2, wherein said tubing is of stainless steel.

5. A tow cart as set forth in claim 1, wherein said wheels are constituted by balls of resilient material.

6. A tow cart as set forth in claim 5, wherein said balls are fabricated of foam plastic material.

7. A tow cart as set forth in claim 1, wherein the space between said ledge and the upturned front end of the main frame accommodates a cold chest which is secured in place by straps having terminal hooks engaging the ledge and the upturned front end.

* * * * *